Jan. 3, 1928.

H. ROBECK 1,654,835

TELEPHONE ELECTRICALLY DRIVEN SOUND BOX

Filed Sept. 5, 1925

Inventor:
Hermann Robeck
By P. Singer, Atty.

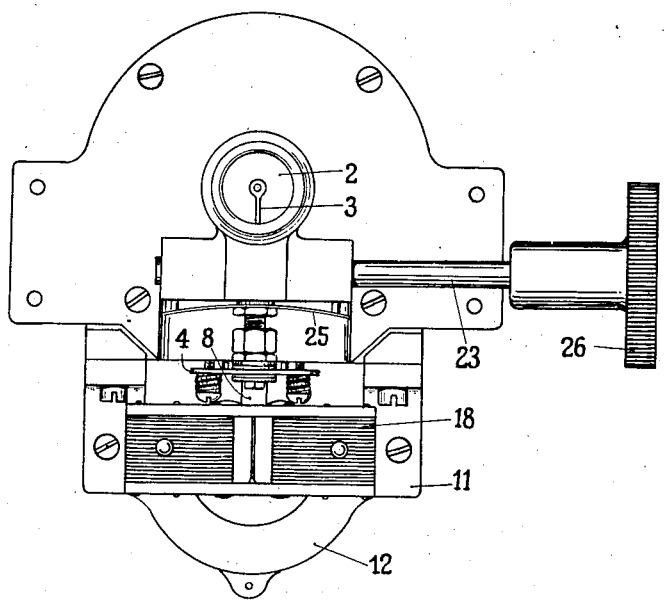
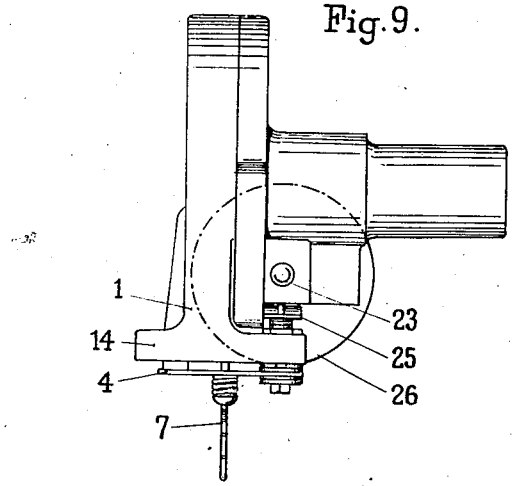

Patented Jan. 3, 1928.

1,654,835

UNITED STATES PATENT OFFICE.

HERMANN ROBECK, OF BERLIN, GERMANY.

TELEPHONE ELECTRICALLY-DRIVEN SOUND BOX.

Application filed September 5, 1925, Serial No. 54,808, and in Germany April 25, 1925.

The subject matter of the present invention relates to that class of telephone-electrically driven sound boxes being furnished with a double armed lever which transfers the oscillations upon the diaphragm of the sound box, the free end of this lever being shaped into an anchor or magnetic pole and enabled to swing between two similarly named poles around which the line or conductor, carrying the sound- or talking-currents, is wound in such a manner that the one stationary pole is strengthened while the other one is weakened. In sound boxes of this kind the anchor or pole being attached to the double armed lever of the sound box, must be held in a floating state between the stationary pole-shoes as otherwise a clean tune or sound cannot be produced.
In order to attain this object the magnet-system of each of the two stationary poles is, according to the present invention, fixed to an angular carrier, which has legs, which are screwed to ears of the casing of the sound box; the bridge piece of which carrier, supports the magnet-system and the pole-shoe, said shoe being screwed with its inner face to the bridge piece of the second carrier provided for the second stationary magnet-pole.

In the accompanying drawing the subject matter of the invention is represented by way of an example in a special mode of construction.

Fig. 1 is a central section through the sound box provided with the telephone-electrical driving means;

Fig. 2 is a front view of the sound box, the front stationary pole being removed;
Fig. 3 is a face or front view of a pole shoe;

Fig. 4 a side view thereof;

Fig. 8 is a rear view of the sound box and

Fig. 9 is a side view of said box in which the stationary pole shoes and magnets are omitted.

Similar numerals refer to similar parts throughout the several views.

Figure 1:
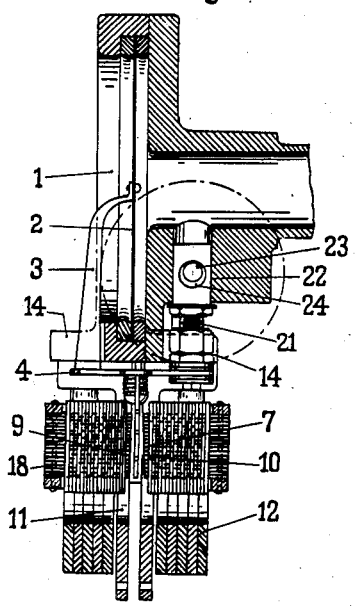
Figure 2:
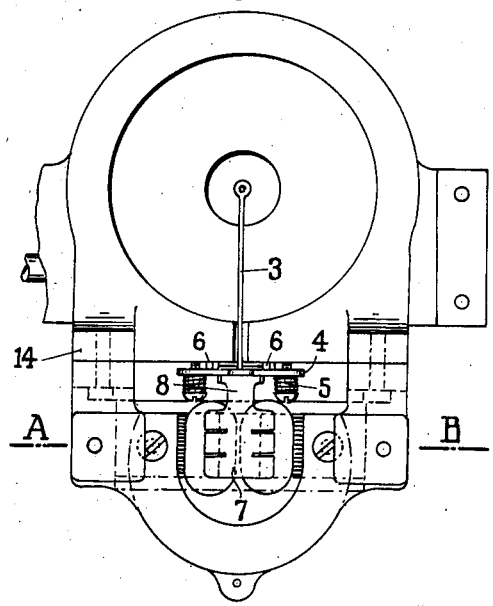
Figure 3:
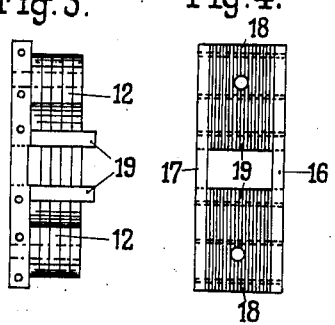
Figure 4:
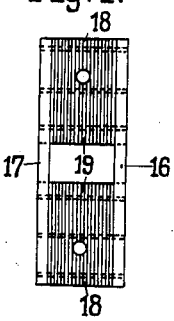
Figure 5:
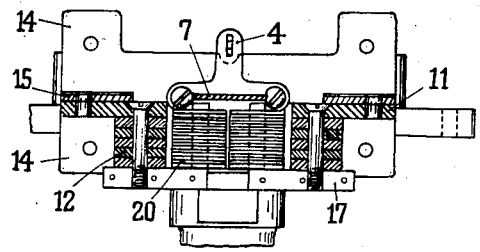
Fig. 5 is a sectional view on line A—B of Fig. 2;
Figure 6:
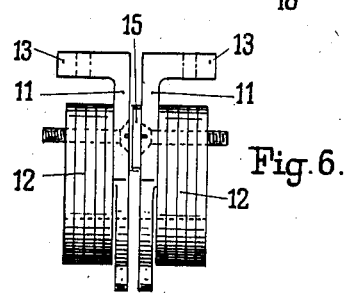
Fig. 6 shows in side view and Fig. 7 is a front view the carrier of the legs of the magnet.
Figure 7:
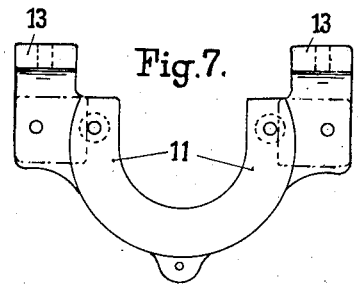

As will be seen from the drawings the numeral 1 indicates the casing of the sound box having a diaphragm 2, the central part of which is connected to the arm 3 having a horizontal bend or bridge 4, which is pressed by means of springs, being adjustable by screws, against points 6 of the casing of the sound box. The points 6 are in a common plane with diaphragm 2, so that the arm 3, together with the bridge 4, is enabled to be swung around an axis lying in the plane of the diaphragm 2 and extending between the connection lines of the points 6. On the bridge 4 the arm 8, carrying the armature 7, is fixed in such a manner that it extends downward. On both sides of the armature 7 the stationary magnet-poles 9 and 10 are situated a slight distance apart from said armature and parallel to each other. In order to secure the proper support and adjustment of said stationary poles with relation to the armature and to the plane of the diaphragm 2 of the sound box the stationary poles are shaped in the manner represented in Figs. 3 to 7. First of all for each pole an angular carrier 11$^a$ is provided having a web or bridge 11 on the outer sides of which the horse-shoe like magnets 12 are attached by means of screws 12$^a$, and a foot 13 which can be secured to the foot 14 of the casing by means of screws 14$^a$. The foot 14 has on its lower side a ground fitting face. The carriers 11$^a$ are arranged in spaced relation, a spacer 15 being arranged between them as shown. Now the proper pole-pieces are erected on the horse-shoe like magnet-body 12, which pole-pieces are formed of angular strips 18 of sheet metal being arranged between two cheeks 16, 17. The rectangular legs 19 of said poles are surrounded by the coils 20. Directly before the front faces of said coils the armature 7 of the lever 3, 4 of the sound box is situated. The front-faces of the feet 13 of the magnet-carrier are ground off to the proper angle with relation to the inner faces of the webs or bridges 11, so that by screwing said webs or bridges to the fitting faces of the feet 14 of the sound box casing the effect will be obtained that the pole faces of the stationary magnets are caused to lie exactly symmetrical in relation to the plane of the sound box diaphragm and parallel to each other. In this manner the proper supporting of the armature between said pole faces is ensured, even when the latter are situated a very slight distance from each other. In order to still permit of a slight adjustability between the armature and the plane of the diaphragm, if there should be any inexactnesses in the supporting of the diaphragm, on that side of the bridge 4 lying opposite to the lever 3 a bar 21 is fixed which is guided in a bush 22 of the casing of the sound box in an axial direction. Transversely through the bush 22 and a hole of the bar 21 a shaft 23 extends which is provided with a milled cut out 24 which forms an eccentric cam. A leaf spring 25 pulls the bar 21 downward. If therefore the shaft 23 is turned, which may be effected by means of the hand wheel 26, the bar 21 will be moved downward to the extent permitted by the cam 24 under the action of said leaf spring 25. Hence the levers 3, 4, 8 together with the armature 7 will be swung out in the same extent. By these means a very exact and fine adjustment between the diaphragm and the armature with respect to the stationary pole faces of the pole pieces 9 and 10 can be obtained.

What I claim is:—

1. A sound box operable by telephone electric currents, comprising a casing, a diaphragm therein, an angular lever having two arms, one of which is connected to the diaphragm, an armature carried by the other arm of the lever, fixed magnets having pole pieces presented to opposite sides of and in spaced relation to the armature, windings on said pole pieces and means mounting the last named arm of said lever for adjustment of said armature between said pole pieces, and carriers for said magnets, each comprising a bridge and members at an angle to said bridge, said bridges being arranged in spaced relation, and a spacer between and connecting said bridges, said casing being secured directly on said members.

2. A sound box operable by telephone electric currents, comprising a casing, a diaphragm therein, an angular lever having two arms, one of which is connected to the diaphragm, an armature carried by the other arm of the lever, fixed magnets having pole pieces presented to opposite sides of and in spaced relation to the armature, windings on said pole pieces and means mounting the last named arm of said lever for adjustment of said armature between said pole pieces, said mounting means comprising a spring active to move said lever arm in one direction, a shaft mounted in the casing and having a cam and a connecting element between said arm and said shaft and arranged to coact with said cam to adjust said lever arm and hence also said armature against the action of said spring.

In testimony whereof I have affixed my signature.

HERMANN ROBECK.